(12) United States Patent
Francescutti

(10) Patent No.: US 6,800,340 B1
(45) Date of Patent: Oct. 5, 2004

(54) USE OF PLASTIC FILMS FOR PRINTING WITH ORGANIC INKS IN AN INKJET PROCESS

(75) Inventor: Robert Francescutti, Neuhofen (DE)

(73) Assignee: Renolit-Werke GmbH, Worms (DE)

( * ) Notice: Subject to any disclaimer, the term of this patent is extended or adjusted under 35 U.S.C. 154(b) by 235 days.

(21) Appl. No.: 10/070,461

(22) PCT Filed: Sep. 7, 2000

(86) PCT No.: PCT/EP00/08733

§ 371 (c)(1),
(2), (4) Date: Mar. 7, 2002

(87) PCT Pub. No.: WO01/19618

PCT Pub. Date: Mar. 22, 2001

(30) Foreign Application Priority Data

Sep. 10, 1999 (DE) .......................... 199 43 330
May 25, 2000 (DE) .......................... 100 25 432

(51) Int. Cl.$^7$ ............................... B41M 5/00
(52) U.S. Cl. .................... 428/32.1; 428/32.17; 347/105
(58) Field of Search ............... 428/195, 213, 428/323, 500, 532, 913.3, 32.1, 32.17; 347/105

(56) References Cited

U.S. PATENT DOCUMENTS

| | | | | |
|---|---|---|---|---|
| 3,967,031 A | * | 6/1976 | Lambert | 428/294 |
| 4,371,654 A | * | 2/1983 | Spielau et al. | 524/296 |
| 4,587,156 A | * | 5/1986 | Wu | 428/207 |
| 4,713,273 A | | 12/1987 | Freedman | 428/40 |
| 5,418,078 A | * | 5/1995 | Desie et al. | 428/704 |
| 5,534,606 A | | 7/1996 | Bennett et al. | 526/281 |
| 5,695,588 A | * | 12/1997 | Daems et al. | 156/247 |
| 5,702,517 A | * | 12/1997 | Meixner et al. | 106/316 |
| 6,184,373 B1 | * | 2/2001 | Bernard et al. | 536/58 |
| 6,264,321 B1 | * | 7/2001 | Bugner et al. | 347/101 |
| 6,361,853 B1 | * | 3/2002 | Shaw-Klein et al. | 428/195 |
| 6,468,637 B1 | * | 10/2002 | Kwasny et al. | 428/201 |
| 6,475,696 B2 | * | 11/2002 | Majumdar et al. | 430/201 |

FOREIGN PATENT DOCUMENTS

| | | |
|---|---|---|
| DE | 1 569 533 | 4/1970 |
| DE | 23 23 999 | 11/1973 |
| DE | 38 82 047 T2 | 1/1994 |
| DE | 43 04 308 | 8/1994 |
| EP | 0 158 428 | 10/1985 |
| EP | 0 709 221 | 5/1996 |

\* cited by examiner

*Primary Examiner*—Bruce H. Hess
*Assistant Examiner*—B. Shewareged
(74) *Attorney, Agent, or Firm*—Foley & Lardner

(57) ABSTRACT

The invention relates to printing of plastic films with organic inks in an inkjet process. The film contains a film-forming plastic and usual auxiliary materials, as well as cellulose esters which improve printability. These esters contain acetyl, propionyl or butyryl groups.

9 Claims, No Drawings

USE OF PLASTIC FILMS FOR PRINTING WITH ORGANIC INKS IN AN INKJET PROCESS

The present invention relates to the use of plastic films for printing with organic inks in an inkjet process, the films being composed of PVC or of other polymers suitable for producing films, these polymers having been modified with additives in such a way as to make them suitable for inkjet printing with organic inks.

There is widespread use of PVC films or other polymeric film materials in place of paper in processes which use printing technology. The preferred method of printing here is the inkjet process, using ink solutions which are water-based. The inkjet process in particular permits digital printing, i.e. computer-controlled variation of the printed images, and thus permits image variability which is impossible using conventional screen printing or roller printing techniques. Since these aqueous inks are normally incompatible with the plastic film, the plastic films are provided with an outer layer (topcoat) which is normally composed of a binder compatible with the film and of relatively large amounts of hydrophilic fillers such as lime, silica gel, aluminum oxide, cellulose powder or the like, which permit penetration of the aqueous ink into the outer layer. In many cases, penetration of aqueous inks is further improved by adding detergents. An important application sector for films of this type is the production of labels, where the printable film has also been secured to a carrier film by way of a permanently flexible adhesive (cf., for example, U.S. Pat. No. 4,713,273). This process is, moreover, also used relatively widely to produce surfaces for advertisements, e.g. on city posters, on public transport, or on banners.

Since water-based inks are not weather-resistant long term and run when wetted, organic inks based on organic solvents have been developed for the inkjet process. These comprise, for example, ethyl acetate, methyl ethyl ketone, or cyclohexanone as organic solvent, PVC and acrylate resins as film formers and thickeners, and also dispersed or dissolved pigments. Unlike an aqueous ink, the inks based on organic solvents adhere directly to a plastic film, dry more quickly, and, due to their binder content, leave a weather- and water-resistant ink film on the plastic film surface. There are also known organic inks based on relatively high-boiling water-free solvents which comprise dispersed or dissolved dyes and binders and give weather-resistant images. These solvents are non-explosive, but they dry only slowly. Disadvantages of the organic inks are that the ink film is mainly present on the surface and is therefore susceptible to mechanical abrasion, and when dots of ink are applied they easily run, because drying is slow, and this militates against sharp profiles and the clean printing of different colors adjacent to one another.

It was therefore an object of the present invention to modify the films in such a way that colors applied using organic inks in an inkjet process penetrate the film surface and no longer run laterally. This is intended to cause the ink to dry more rapidly at the surface and become wipe-resistant, improving the resolution of the printed image and permitting an increase in printing speed.

Surprisingly, this object can be achieved by admixing sufficient amounts of cellulose esters with the synthetic polymer composition known per se and suitable for forming the film. A mixture of the synthetic polymer composition with other plastics or fillers proves to be ineffective.

The films of the invention can replace paper and top-coated films in inkjet printing processes used hitherto, and can also be used as a print feedstock in synthetic floor coverings or wall coverings, or else in weatherproof coverings for tents or trucks or advertising surfaces.

To produce the films which can be used according to the invention, a usual film composition in the form of a powder which comprises the plastic and usual auxiliaries such as plasticizers, fillers, stabilizers, pigments, etc. is mixed with an appropriate powder of the cellulose esters, plastified in a kneader, and, via a calender or by extrusion, processed to give films whose weight per unit area is from 50 to 100 g/m². As an alternative, it is possible, of course, to laminate a layer of the above makeup with thickness from 10 to 50$\mu$ as an outer film to a base film made from other types of polymers and, for example, colored white using titanium dioxide, barium sulfate, or calcium carbonate, or to use a coextrusion process to produce the two layers together. It is further possible to produce films of this type in a known manner from a plastisol, i.e. a mixture made from synthetic polymer particles, fillers, and other auxiliaries, and converted to a paste in appropriate diluents and plasticizers, where appropriate amounts of cellulose esters have been incorporated into the plastisol, and to apply this as a layer by spreading or doctoring and to gel it at temperatures of 150–200° C. to give a film. For reasons of stability, a stabilizing textile or a synthetic polymer film, or else a peelable silicone paper, is used as substrate. There are also known casting processes for producing films of this type, and these are likewise suitable.

The cellulose esters used according to the invention have substantively been esterified using acetyl, propionyl and/or butyryl groups, the residual content of free hydroxyl groups in the cellulose being small, from about 0.5 to 3%. Preference is given here to mixtures of acetyl groups with propionyl and/or butyryl groups, which give the plastic a low hardness. Particular preference is given to acetyl butyryl celluloses having, based on the mass of the cellulose ester, about 13% of acetyl and 38% of butyryl groups, alongside a residue of about 1.5% of hydroxyl groups. It is intended that the cellulose esters make up 5–50%, preferably 8–20%, of the film composition. Plastisols permit incorporation of up to 30% of cellulose esters. At higher levels, the composition becomes too stiff to process, and the tensile strength of the resultant films becomes too low. However, for the production of printable waterproofing materials, floor coverings or plastic wall coverings it is also possible to manufacture relatively thick layers of 200–500 $\mu$m from plastisols which have an appropriate stable substrate.

For reasons of price, it is preferable to use PVC as film base material, this having been treated with about 10–30%, preferably 20%, of a usual plasticizer (such as dioctyl phthalate or diisodecyl phthalate, or else a usual polymeric plasticizer) based on the mass of PVC. However, it is also possible to use other synthetic polymer materials which can readily be molded to give films, such as polyethylene or polypropylene, polystyrene, polycarbonate, or else other polyesters.

Usual additives besides plasticizers are UV stabilizers, crosslinkers, fillers, pigments, etc.

Polyvinyl butyral, aluminum oxide, polymethyl acrylate, talc, EVA are also incorporated as film moderators into the PVC film. Unlike the cellulose esters, they do not give any improvement in the sharpness of profiles of thin lines of sprayed ink when comparison is made with a corresponding unmodified film, and they are therefore not suitable as additives which improve printing.

DE 43 04 308 A1 describes stiff films made from cycloolefin copolymers which can be used as a capacitor dielectric, for electrical insulation, as a packaging film, as a repro film, or as a viewing window for LCD cells. The films have high transparency, good dielectric properties, high softening points, and good impermeability to gas, but are unsuitable for use according to the invention as films for receiving organic inkjet inks. The possibility of mixing with a very wide variety of plastics and polymers, inter alia cellulose propionate, is mentioned speculatively, and it is possible for these to be compatible or incompatible and also, where appropriate, to form separate layers. Nothing is said as to the direction in which this admixture modifies properties.

DE 38 82 047 T2 relates to molded articles made from linear polyesters with a filler made from cellulose acetate microbeads, air-filled pore cavities being produced here by stretching the polyester phase around the cellulose acetate beads, which are incompatible with the polyester. Due to refraction, these air-filled cavities give the article an opaque appearance and permit liquids to penetrate these cavities, as into a sponge. Films produced in this way can be used as synthetic paper and can be inscribed using printing colors or aqueous ink. Products of this type are unsuitable for the inkjet process, since the capillary absorption of the ink leads to diffuse running of sprayed ink droplets.

DE 15 69 533 A describes a process for reducing the soilability of plasticized PVC surfaces, by adding a cellulose ester in the form of an organic solution to the PVC paste. The films produced in this way are said to be protected from soiling by dust, fats, oils, and not, and to have high resistance to ballpoint pen inks and normal writing inks. Use in an inkjet process therefore appears impossible.

EXAMPLE 1

PVC Film

Calender Film with Additives

A PVC film composition composed of 78.5 g of PVC, 1.5 g of PMMA, 19 g of diisodecyl phthalate (DIDP), 2.5 g of epoxidized soya oil (ESO), 2.4 g of stabilizer and also 9 g of titanium white pigment is mixed with the following additives and calendered to give a film of 80μ thickness, and printed in an inkjet process.

| Additive | Amount (g) | Effect |
|---|---|---|
| No additive (control) | — | >500 |
| Cellulose acetate butyrate | 10.0 | <10 |
| Cellulose acetate butyrate | 7.5 | 10–30 |
| Cellulose acetate butyrate | 5.0 | 30–50 |
| Cellulose acetate butyrate | 2.5 | 80–100 |
| Polyvinyl butyral | 5.0 | >400 |
| $Al_2O_3$ | 10.0 | >300 |
| PMMA | 5.0 | >200 |
| Talc | 3.0 | >400 |
| EVA | 5.0 | >200 |
| $CaCO_3$ | 20.0 | >300 |

The effect was measured as color run between two different colors. The values in the table have been given as the run width in μm.

EXAMPLE 2

Plastisol Films with Cellulose Ester Additive

A plastisol base made from 40 parts of PVC and 28 parts of PVC/VA copolymer, converted to a paste using 28 parts of diisodecyl phthalate and 1.5 parts of ESO (epoxidized soya oil), and also 0.3 parts of low-boiling hydrocarbon diluents, and stabilized using 1.9 parts of Ba/Zn didecyl phenyl phosphite, is mixed with a white pigment made from 20 parts of $TiO_2$, 10 parts of dioctyl phthalate, 30 parts of diluent, and the amounts stated in the table below of a cellulose acetate butyrate powder, and spread by means of a doctor in layers of 300–450 μm on a siliconized textile, and heated in a gelling oven at 180–200° C. for 1–2 min. Once the textile has been pulled away the products are white films which absorb organic inks and whose tensile strength is similar to that of paper.

| Additive (parts by weight) | Mix 1 | Mix 2 | Mix 3 |
|---|---|---|---|
| Plastisol base | 320 | 420 | 313 |
| White pigments | 18 | 30 | 30 |
| Cellulose esters | 80 | 160 | 160 |

EXAMPLE 3

PVC Calender Films with Cellulose Esters

A synthetic polymer base of PVC powder and PMMA powder is mixed with phthalic ester (undecyl ester or diisodecyl ester) as plasticizer (Phth), Ba/Zn didecyl phenyl phosphite as stabilizer, $TiO_2$ as white pigment, and cellulose acetate butyrate (CAB) as filler, in the amounts given below below, homogenized in a kneader, and processed on a calender as in Example 1 to give films of thickness 80–85 μm which have good tensile strength. All of the films have good printability in an inkjet process.

| Additive (parts by weight) | Mix a | Mix b | Mix c | Mix d | Mix e | Mix f | Mix g | Mix h | Mix i | Mix k |
|---|---|---|---|---|---|---|---|---|---|---|
| PVC | 78 | 78 | 76 | 76 | 77 | 77 | 75 | 72 | 59 | 59 |
| PMMA | 1.5 | 1.5 | 1.5 | 1.5 | 1.5 | 1.5 | 1.5 | 1.5 | — | — |
| Phth | 19 | 20 | 21 | 21 | 20 | 20 | 22 | 25 | 28 | 28 |
| $TiO_2$ | 9 | 9 | 9 | 9 | 9 | 18 | 9 | 9 | 9 | 9 |
| CAB | 12.5 | 15 | 20 | 25 | 15 | 15 | 30 | 50 | 50 | 100 |

All of the data in % presented in this application are based on % by mass unless otherwise stated.

What is claimed is:

1. A method of using a plastic film for printing with organic ink in an inkjet process, comprising:
   ink jet printing directly on the plastic film with the organic ink;
   wherein:
   the plastic is selected from polyvinyl chloride, polyethylene, polypropylene, polystyrene, polycarbonate, poly(meth)acrylate or mixtures of these, and the plastic film further comprises from 5 to 50% of cellulose esters, where the esters contain acetyl, propionyl, or butyryl groups.

2. The use as claimed in claim 1, wherein the plastic film comprises from 8 to 20% by weight of cellulose esters.

3. The use as claimed in claim 1, wherein the plastic film comprises auxiliaries selected from at least one of plasticizers, UV stabilizers, fillers, pigments, and wetting agents.

4. The use as claimed in claim 1, wherein the plastic makes up 20–70% of the film material, the plasticizer up to 30%, and the fillers up to 30%.

5. The use as claimed in claim 1, wherein the plastic film comprises from 2 to 10% of a white pigment selected from titanium dioxide, barium sulfate or calcium carbonate.

6. The use as claimed in claim 1, wherein the film is a calender film with a thickness of from 50 to 150 $\mu$m.

7. The use as claimed in claim 1, wherein the plastic film comprises an outer layer of 10–15$\mu$ thickness laminated together with a base film of 30–100$\mu$ thickness.

8. The use as claimed in claim 1, wherein the film is a spread or cast film with a thickness of up to 500 $\mu$m and is laminated to a textile.

9. The use as claimed in claim 3, wherein the plastic makes up 20–70% of the film material, the plasticizer up to 15%, and the fillers up to 30%.

* * * * *

UNITED STATES PATENT AND TRADEMARK OFFICE
CERTIFICATE OF CORRECTION

PATENT NO.    : 6,800,340 B1
DATED         : October 5, 2004
INVENTOR(S)   : Robert Francescutti It is certified that error appears in the above-identified patent and that said Letters Patent is hereby corrected as shown below:

<u>Title page,</u>
Item [73], Assignee, should read -- RENOLIT AG --

Signed and Sealed this

Twenty-sixth Day of July, 2005

JON W. DUDAS
*Director of the United States Patent and Trademark Office*